(12) United States Patent
Hsu

(10) Patent No.: US 7,922,133 B2
(45) Date of Patent: Apr. 12, 2011

(54) FLAT PANEL DISPLAY SUPPORT

(75) Inventor: Chun-Ching Hsu, Shulin (TW)

(73) Assignee: Shin Zu Shing Co., Ltd. (TW)

( * ) Notice: Subject to any disclaimer, the term of this patent is extended or adjusted under 35 U.S.C. 154(b) by 334 days.

(21) Appl. No.: 12/283,527

(22) Filed: Sep. 12, 2008

(65) Prior Publication Data

US 2010/0065702 A1 Mar. 18, 2010

(51) Int. Cl.
*F16M 11/00* (2006.01)
(52) U.S. Cl. .... 248/127; 248/133; 248/917; 361/679.21
(58) Field of Classification Search .............. 248/127, 248/917, 919, 920, 133, 150, 351, 441.1; 361/679.21, 679.2, 679.59, 679.6
See application file for complete search history.

(56) References Cited

U.S. PATENT DOCUMENTS

| | | | | |
|---|---|---|---|---|
| 5,538,214 A * | 7/1996 | Sinila | | 248/278.1 |
| 7,320,451 B2 * | 1/2008 | Ogawa | | 248/161 |
| 7,467,773 B2 * | 12/2008 | Ogawa et al. | | 248/472 |
| 7,636,133 B1 * | 12/2009 | Hsu | | 348/794 |
| 7,770,856 B2 * | 8/2010 | Depay | | 248/284.1 |
| 7,828,255 B2 * | 11/2010 | Yen et al. | | 248/162.1 |
| 2008/0283691 A1 * | 11/2008 | Bliven et al. | | 248/125.2 |
| 2009/0166482 A1 * | 7/2009 | Gan et al. | | 248/122.1 |

* cited by examiner

*Primary Examiner* — Anita M King
(74) *Attorney, Agent, or Firm* — Jackson Walker, LLP

(57) ABSTRACT

A flat panel display (FPD) support has a supporting bracket, a connecting assembly pivotally connected to the supporting bracket and a pulling assembly mounted between the supporting bracket and the connecting assembly. The connecting assembly is attached to an FPD to allow the supporting bracket to hold the FPD on a plane. The pulling assembly pulls the supporting bracket toward the panel bracket and a weight of the FPD allows the FPD and the supporting bracket leaning to each other to stay in a specific angle. Therefore, a visual angle of the FPD relative to a plane is easily adjusted by the supporting assembly. The FPD with the FPD support is light, simple and portable and is conveniently packaged for sale or transportation and does not occupy a large area when in use.

18 Claims, 11 Drawing Sheets

FLAT PANEL DISPLAY SUPPORT

BACKGROUND OF THE INVENTION

1. Field of the Invention

The present invention relates to a flat panel display (FPD) support, especially to an FPD support that allows an FPD to be stood on a plane and a visual angle of the FPD adjusted.

2. Description of the Prior Arts

A flat panel display (FPD) is mounted on an FPD support with a hinge. The hinge allows the FPD to pivot relative to the FPD support and to adjust a visual angle of the FPD.

A conventional FPD support has a large base to stand stably on a plane. Consequently, the FPD with the conventional FPD support requires a large box for sale and has a large footprint, occupying a large area of a desk or table when in use.

To overcome the shortcomings, the present invention provides an FPD support to mitigate or obviate the aforementioned problems.

SUMMARY OF THE INVENTION

The main objective of the present invention is to provide a flat panel display (FPD) support.

The FPD support has a supporting bracket, a connecting assembly pivotally connected to the supporting bracket and a pulling assembly mounted between the supporting bracket and the connecting assembly. The connecting assembly is attached to an FPD to allow the supporting bracket to hold the FPD on a plane. The pulling assembly pulls the supporting bracket toward the panel bracket and a weight of the FPD allows the FPD and the supporting bracket leaning to each other to stay in a specific angle.

Therefore, a visual angle of the FPD relative to a plane is easily adjusted by the supporting assembly. The FPD with the FPD support is light, simple and portable and is conveniently packaged for sale or transportation and does not occupy a large area when in use.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
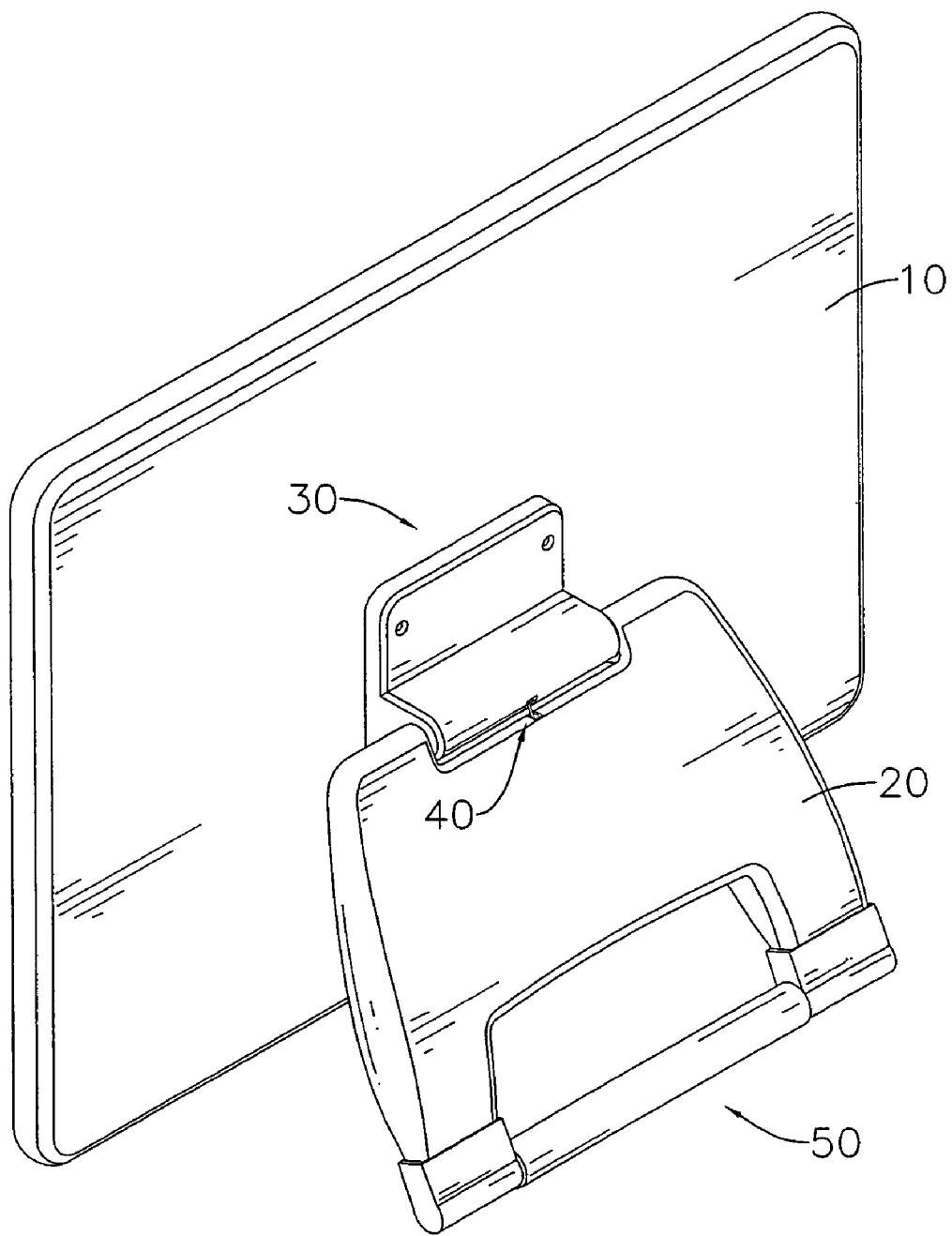
FIG. 1 is a perspective view of a flat panel display (FPD) support in accordance with the present invention.
Figure 2:
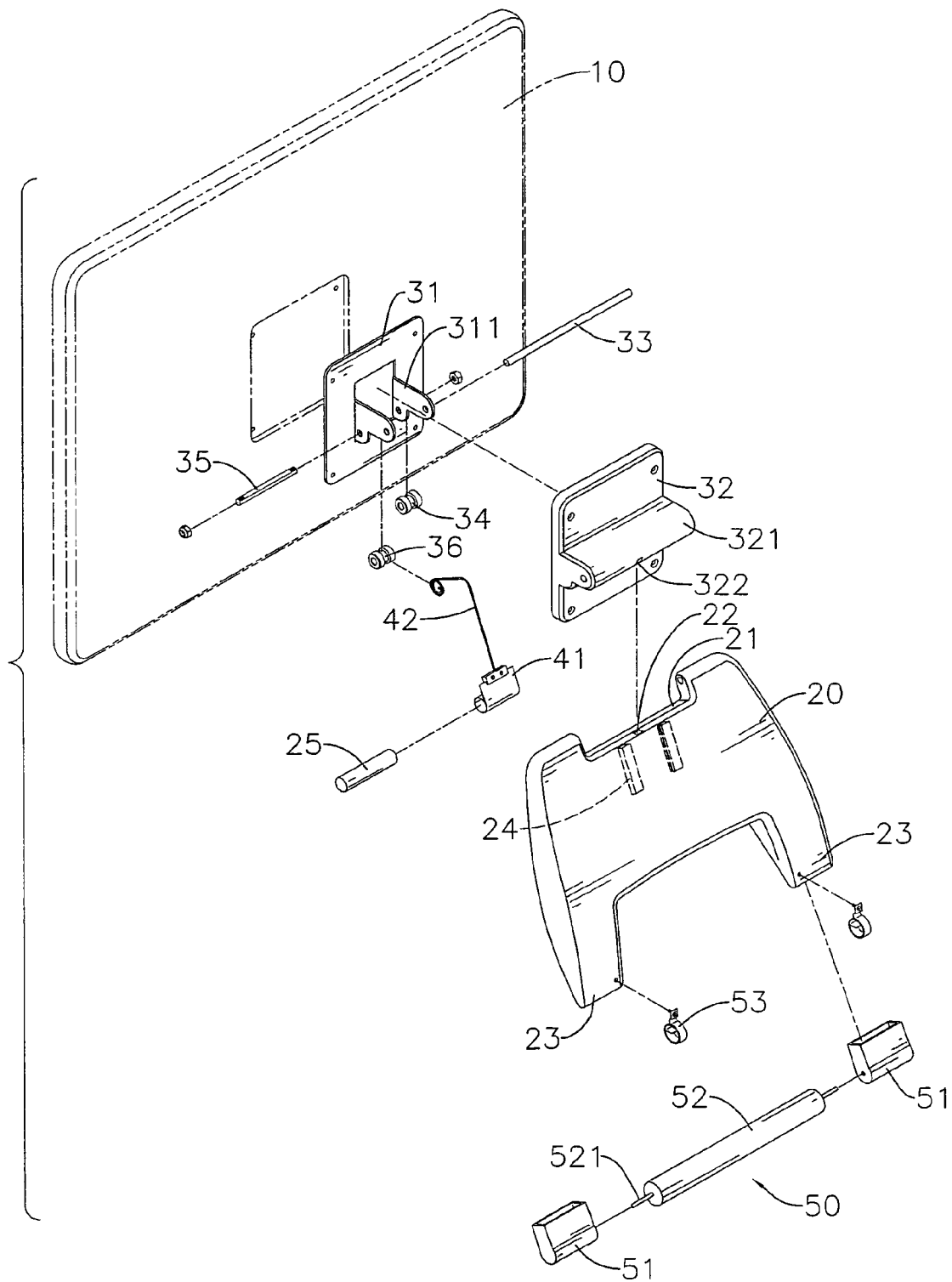
FIG. 2 is an exploded perspective view of the FPD support in FIG. 1, showing a panel frame in phantom line.
Figure 7:
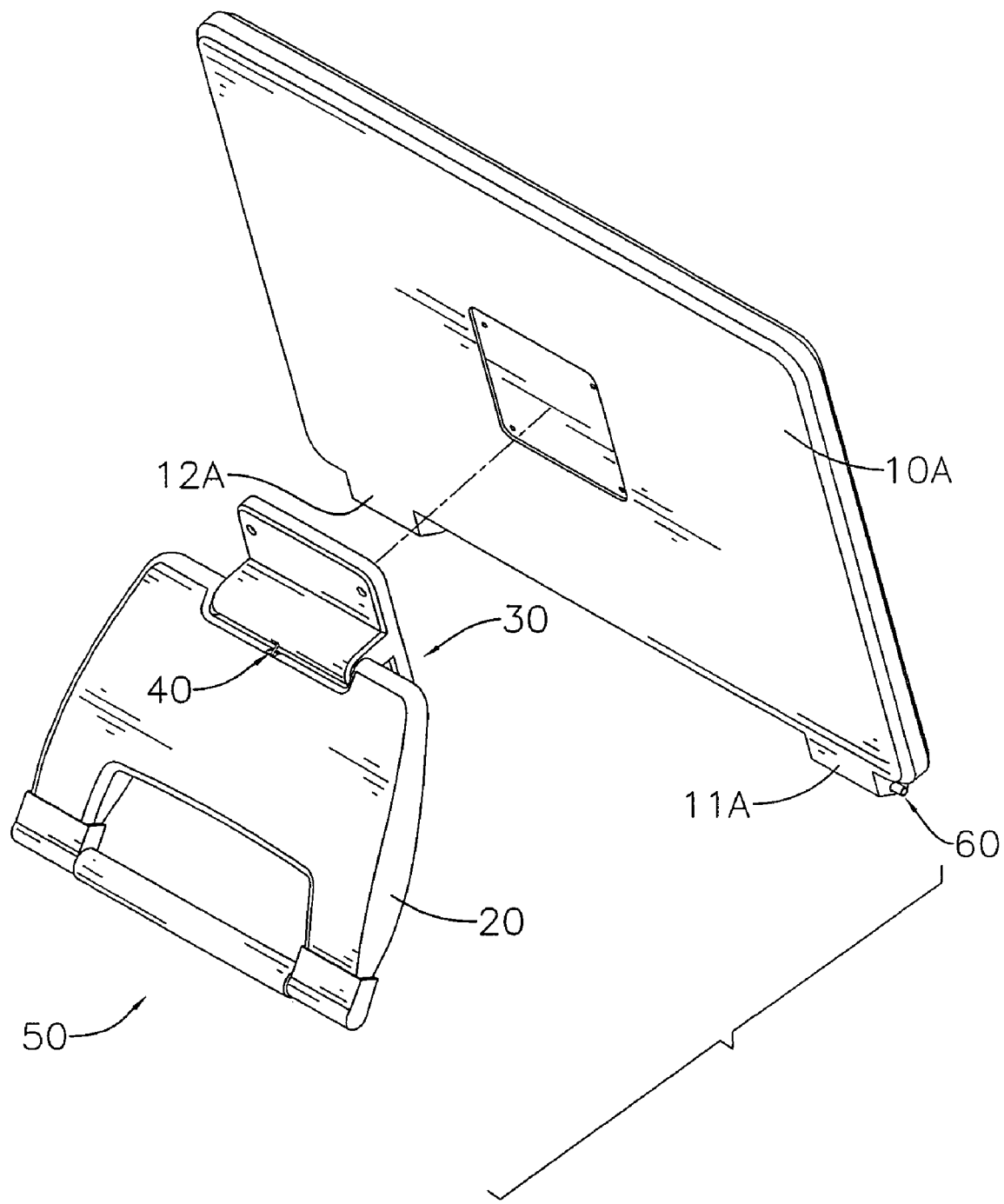
FIG. 7 is an exploded perspective view of another embodiment of a FPD support in accordance with the present invention.

With reference to FIGS. 1, 2 and 7, a flat panel display (FPD) support in accordance with the present invention comprises a panel frame (10, 10A), a supporting bracket (20), a connecting assembly (30), a pulling assembly (40), a sliding assembly (50) and a locking assembly (60).

Figure 10:
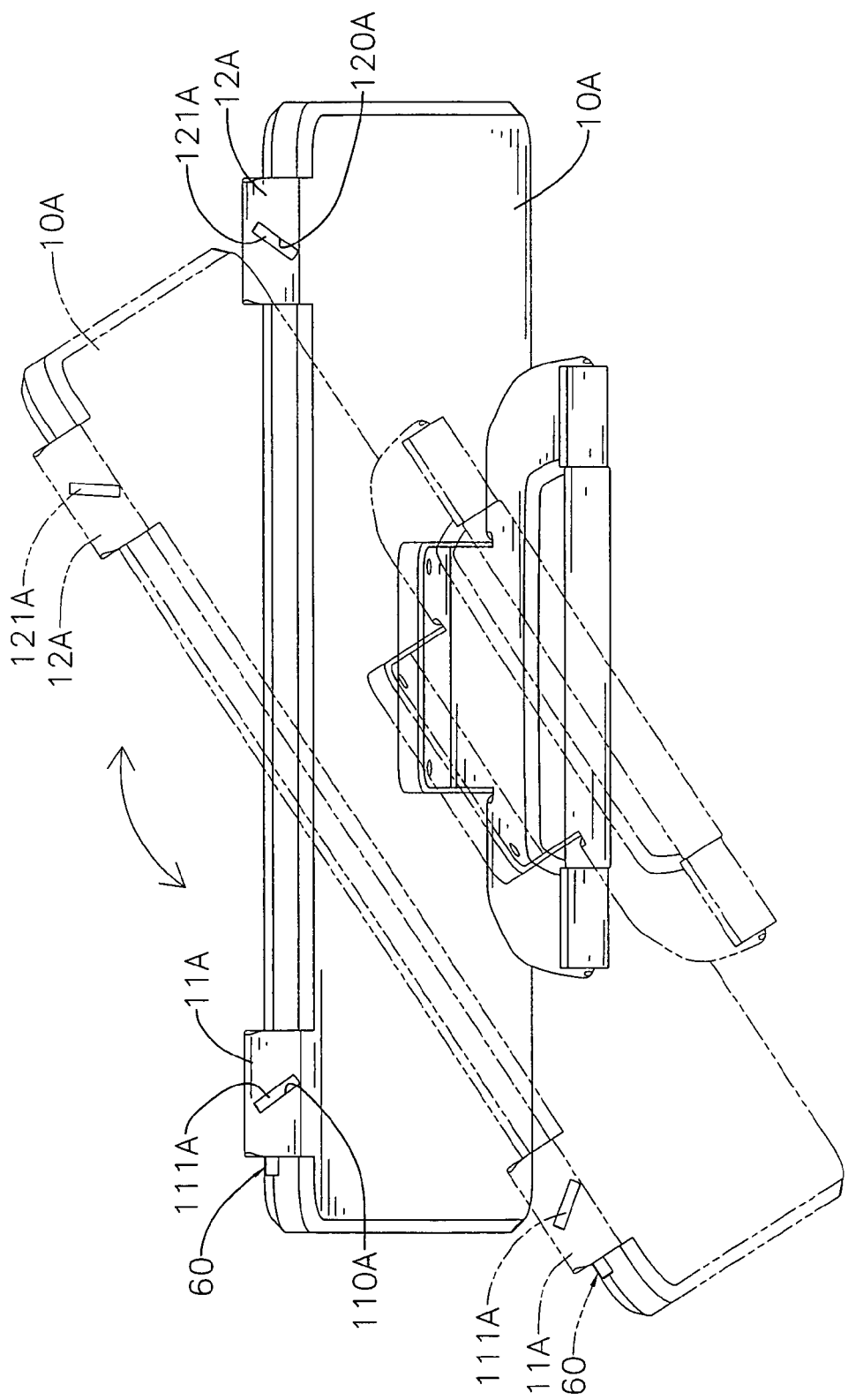
FIG. 10 is an operational bottom view of the FPD support in FIG. 7.

With further reference to FIG. 10, the panel frame (10, 10A) allows an FPD to be mounted inside, has a bottom and may have a first foot (11A), a second foot (12A) and two wheels (111A, 121A).

Figure 9:
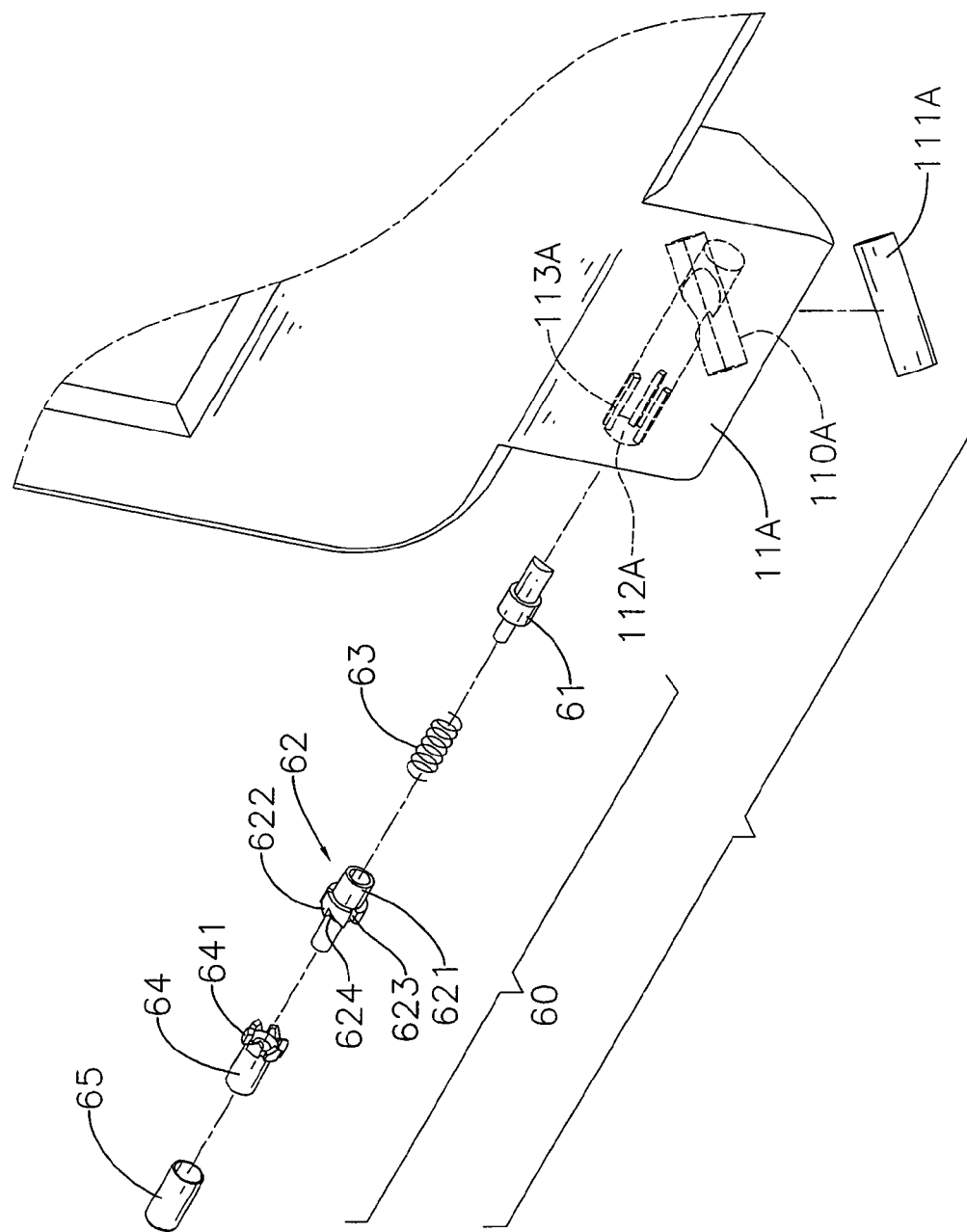
FIG. 9 is an exploded perspective view of the locking assembly of the FPD support in FIG. 7, showing the panel frame in phantom line.
Figure 11:
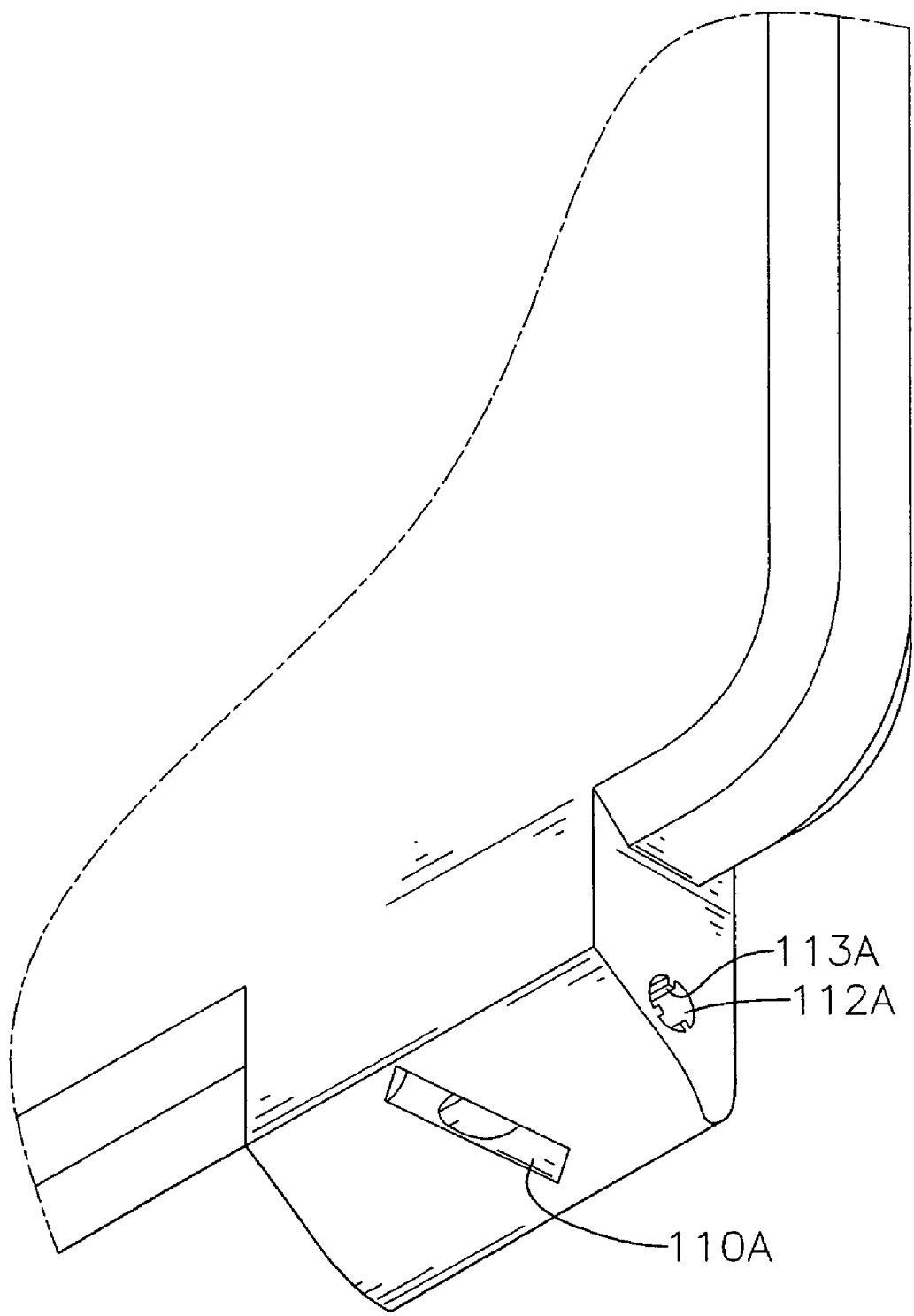
FIG. 11 is an enlarged perspective view of the panel frame of the FPD support in FIG. 7.

With further reference to FIGS. 9 and 11, the first foot (11A) is formed on and protrudes from the bottom of the panel frame (10A), has a bottom surface, a side surface and may have a wheel recess (110A), a mounting recess (112A) and multiple ribs (113A). The wheel recess (110A) is formed in the bottom surface of the first foot (11A) and is oblique to the side surface of the first foot (11A). The mounting recess (112A) is formed in the side surface of the first foot (11A), communicates with the wheel recess (110A) of the first foot (11A) and has an inner surface. The ribs (113A) are separately and axially formed on the inner surface of the mounting recess (112A) of the first foot (11A). Each rib (113A) has an inner end.

With further reference to FIG. 10, the second foot (12A) is formed on and protrudes from the bottom of the panel frame (10A), is opposite to the first foot (11A) and has a bottom surface, a side surface and a wheel recess (120A). The wheel recess (120A) is formed in the bottom surface of the second foot (12A) and is oblique to the side surface of the second foot (12A).

The wheels (111A, 121A) are respectively and rotatably mounted in the wheel recesses (110A, 120A) of the first and the second feet (11A, 12A) to allow the panel frame (10A) to rotate clockwise or counterclockwise to adjust an visual angle.

Figure 3:
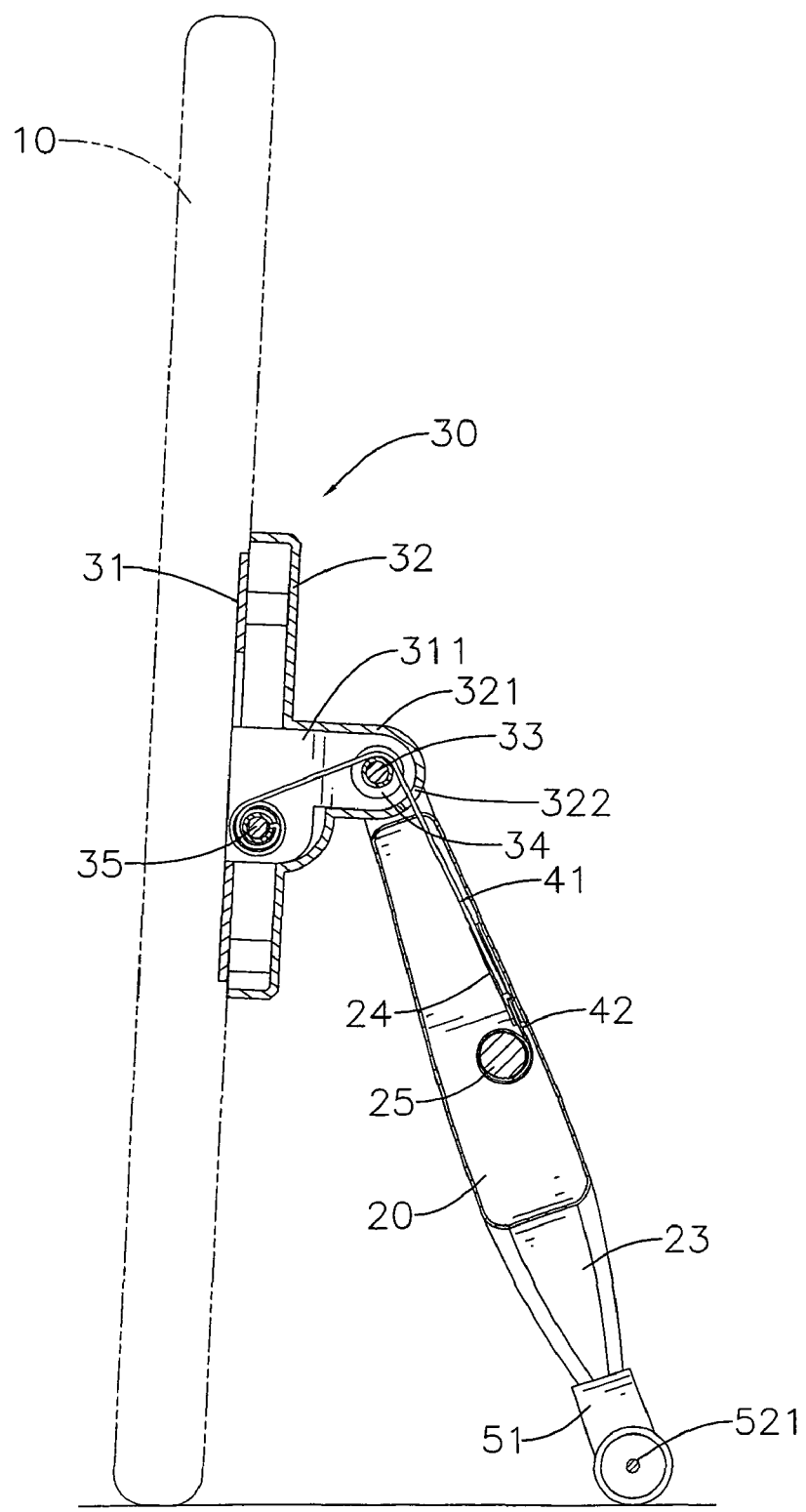
FIG. 3 is a side view in partial section of the FPD support in FIG. 1, showing the panel frame in phantom line.

With further reference to FIG. 3, the supporting bracket (20) holds the panel frame (10, 10A) on a plane, is hollow and has an inner cavity, an upper edge, a lower edge, a pivot recess (21), a through hole (22), two feet (23), two leading tracks (24) and a rod (25).

The pivot recess (21) is formed in the upper edge of the supporting bracket (20) and has a bottom.

The through hole (22) is formed through the upper edge of the supporting bracket (20), communicates with the inner cavity and may be formed through the bottom of the pivot recess (21).

The feet (23) are formed on and protrude oppositely from the lower edge of the supporting bracket (20).

The leading tracks (24) are separately mounted in the inner cavity of the supporting bracket (20) adjacent to the through hole (22) of the supporting bracket (20) and are perpendicular to the upper edge of the supporting bracket (20).

The rod (25) is mounted in the inner cavity of the supporting bracket (20), may be mounted between the leading tracks (24) and is parallel to the upper edge of the supporting bracket (20).

The connecting assembly (30) is attached to the panel frame (10, 10A), is pivotally connected to the supporting bracket (20), has a connector, a guiding shaft (33), a guiding roller (34), a mounting shaft (35) and a mounting roller (36).

The connector has a fastening bracket (31), a pivoting cover (32) and a through hole (322).

The fastening bracket (31) is attached to the panel frame (10, 10A) and has a rear surface and two limiting protrusions (311). The limiting protrusions (311) are separately formed on the rear surface of the fastening bracket (31) and correspond to each other.

The pivoting cover (32) is securely mounted on the fastening bracket (31) and has a pivoting protrusion (321). The pivoting protrusion (321) is hollow, is mounted around the limiting protrusions (311) of the fastening bracket (311), is pivotally connected to the supporting bracket (20) and may be mounted in the pivot recess (21) of the supporting bracket (20).

The through hole (322) is formed through the connector, may be formed through the pivoting protrusion (321) of the pivoting cover (32) and corresponds to the through hole (22) of the supporting bracket (20).

The guiding shaft (33) is mounted through the connector, may be mounted through the limiting protrusions (311) of the fastening bracket (31) and the pivoting protrusion (321) of the pivoting cover (32) and is rotatably connected to the supporting bracket (20) to allow the panel frame (10, 10A) and the connector of the connecting assembly (30) to pivot relative to the supporting bracket (20).

The guiding roller (34) is rotatably mounted around the guiding shaft (33) of the connecting assembly (30) and may be mounted between the limiting protrusions (311) of the fastening bracket (31).

The mounting shaft (35) is mounted in the connector and may be mounted between the limiting protrusions (311) of the fastening bracket (31).

The mounting roller (36) is rotatably mounted around the mounting shaft (35) of the connecting assembly (30) and may be mounted between the limiting protrusions (311) of the fastening bracket (31).

The pulling assembly (40) is mounted between the supporting bracket (20) and the connecting assembly (30), is wound around the rod (25) of the supporting bracket (20), is mounted through the through holes (22, 322) of the supporting bracket (20) and the connector of the connecting assembly (30), is mounted on the guiding shaft (33) of the connecting assembly (30), has two ends and may be implement with a leaf spring (41) and a rope (42).

The ends of the pulling assembly (40) are respectively attached to the rod (25) of the supporting bracket (20) and the connector of the connecting assembly (30).

The leaf spring (41) is wound around the rod (25) of the supporting bracket (20) and has two opposite edges. The edges of the leaf spring (41) are respectively mounted movably between the leading tracks (24) of the supporting bracket (20).

The rope (42) may be wound around the mounting roller (36) of the connecting assembly (30), is mounted on the guiding shaft (33) of the connecting assembly (30), may be mounted on the guiding roller (34) on the guiding shaft (33), is mounted through the through holes (22, 322) of the supporting bracket (20) and the connector of the connecting assembly (30) and has two ends. The ends of the rope (42) are respectively attached to the connector of the connecting assembly (30) and the leaf spring (41) and may be respectively attached to the mounting roller (36) of the connecting assembly (30) and the leaf spring (41).

Therefore, the supporting bracket (20) and the panel frame (10) pivot toward each other through a resilient force of the leaf spring (41).

Figure 4:
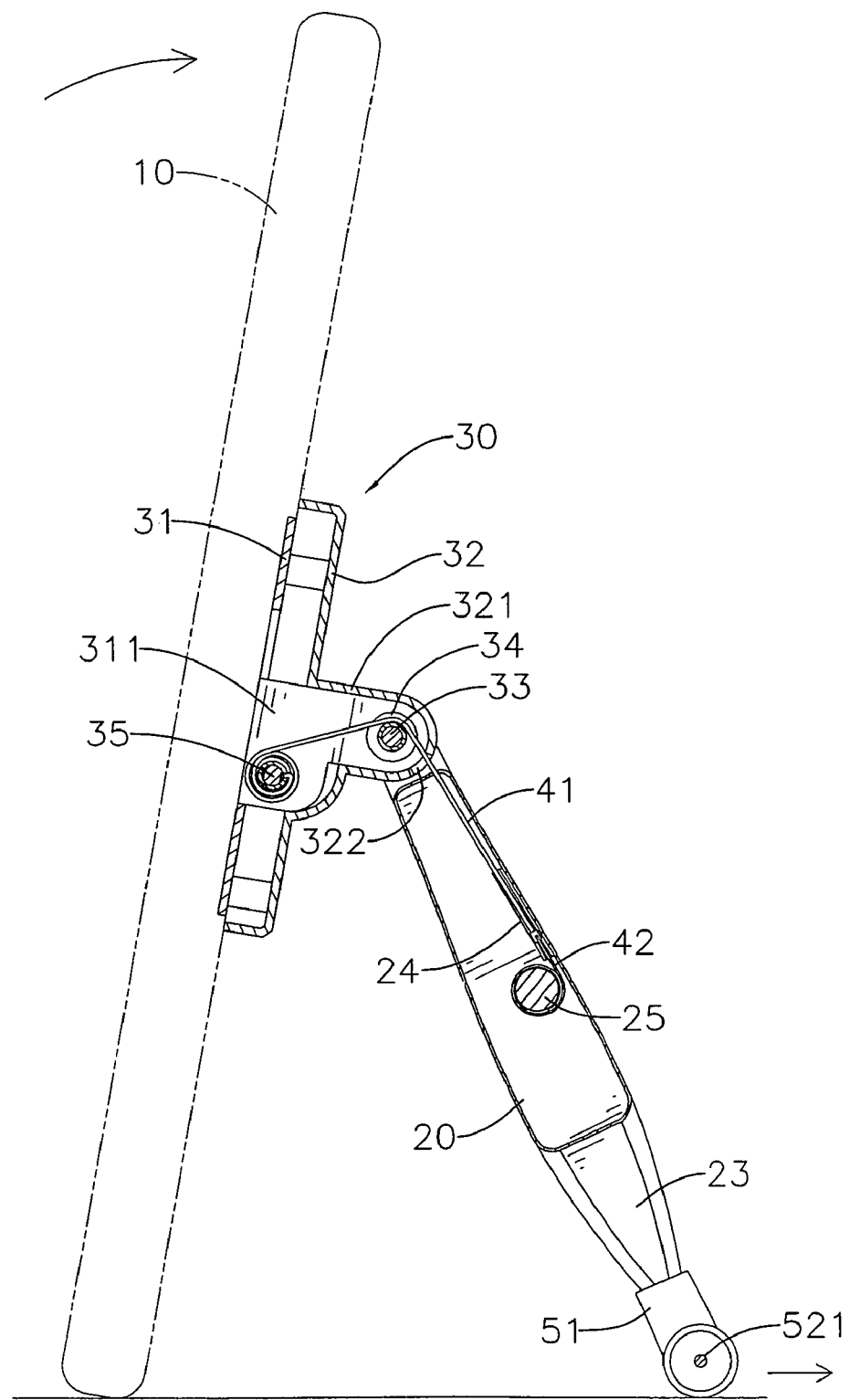
FIG. 4 is an operational side view in partial section of the FPD support in FIG. 1, shown leaning and showing the panel frame in phantom line.

With further reference to FIG. 4, while an FPD is mounted in the panel bracket (10) and leaning, the supporting bracket (20) pivots away from the panel bracket (10). Thus, an angle of the supporting bracket (20) relative to the panel bracket (10) is adjusted and a weight of the FPD allows the supporting bracket (20) to stay in a specific angle.

Figure 5:
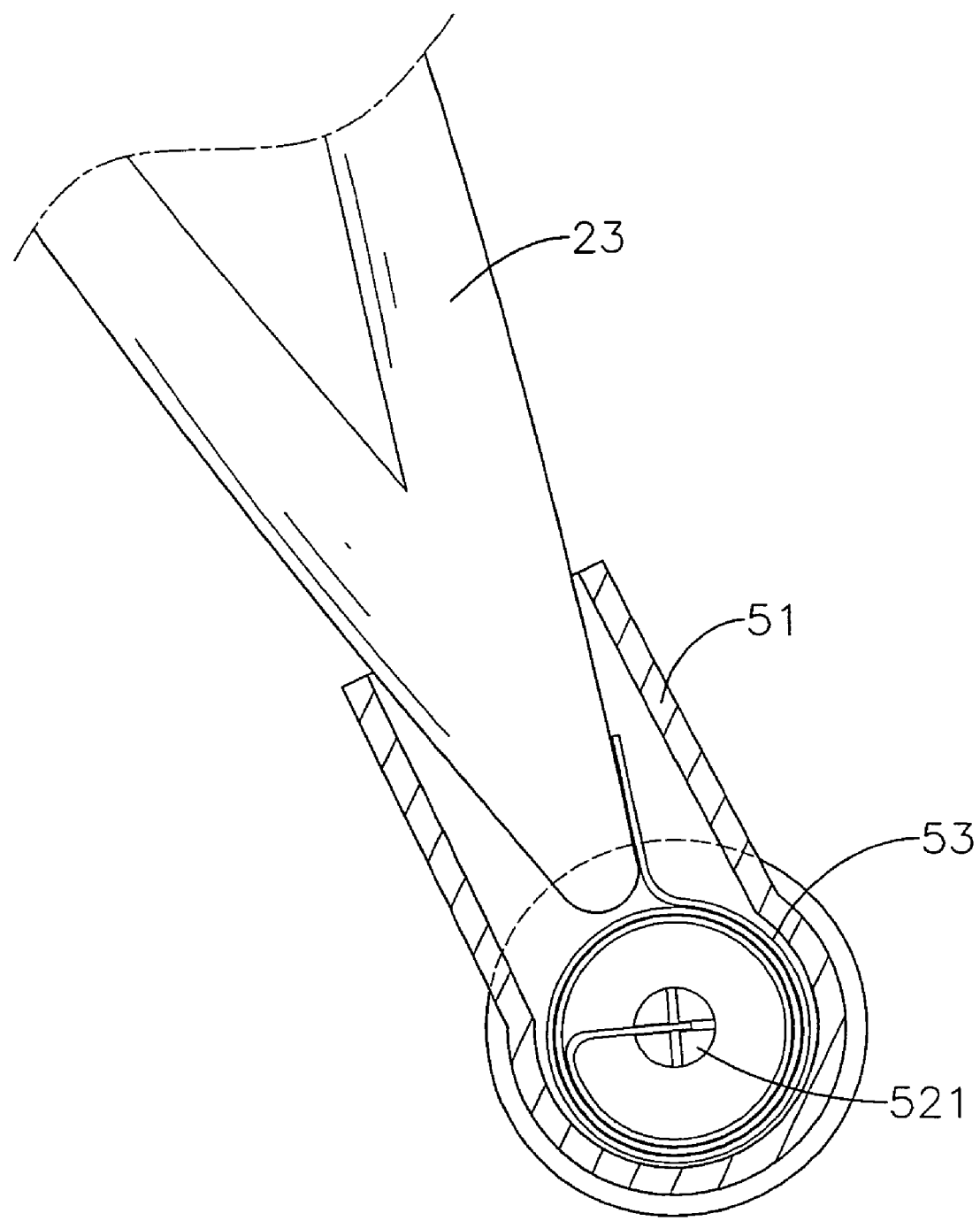
FIG. 5 is an enlarged side view in partial section of the FPD support in FIG. 1.

With further to FIG. 5, the sliding assembly (50) is mounted between the feet (23) of the supporting bracket (20) and has two spring seats (51), a moving roller (52) and two coiled springs (53).

The spring seats (51) are respectively mounted on the feet (23) of the supporting bracket (20).

The moving roller (52) is rotatably mounted between the feet (23) of the supporting bracket (20) and may have two ends and two bars (521). The bars (521) are respectively formed on and protrude from the ends of the moving roller (52) and are respectively and rotatably mounted through and into the spring seats (51).

The coiled springs (53) are respectively mounted in the spring seats (51). Each coiled spring (53) is wound around the corresponding bar (521) of the moving roller (52) and has two ends. The ends of the coiled spring (53) are respectively and securely attached to the corresponding bar (521) of the moving roller (52) and the corresponding spring seat (51).

Figure 6:
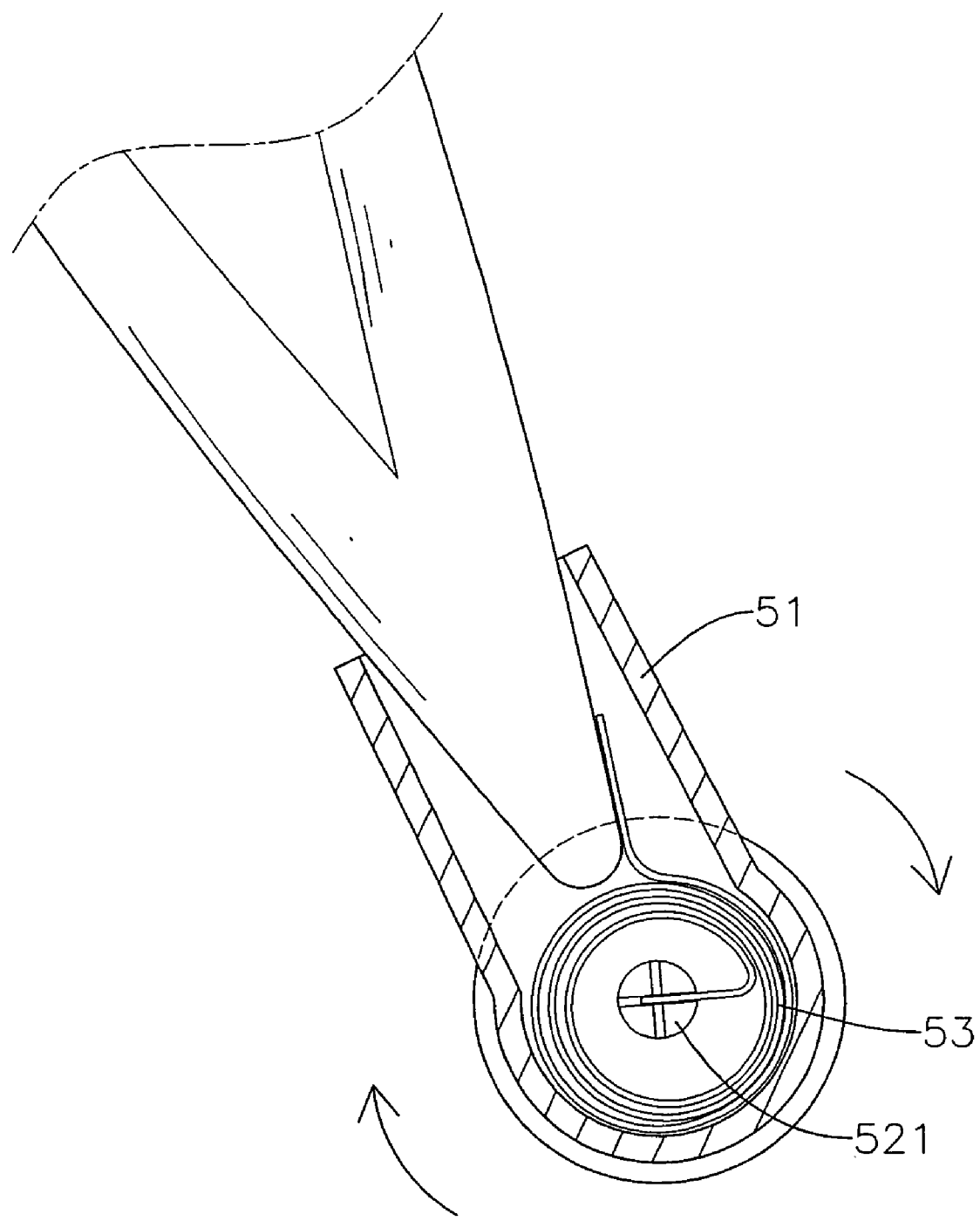
FIG. 6 is an operational enlarged side view in partial section of the FPD support in FIG. 1.

With further reference to FIG. 6, while the supporting bracket (20) pivots away from the panel bracket (10), the feet (23) of the supporting bracket (20) and the spring seats (51) of the sliding assembly (50) move away from the panel bracket (10) and the moving roller (52) helps the spring seats (51) of the sliding assembly (50) to move smoothly. Then the bars (521) of the moving roller (52) winds the coiled spring (53). Therefore, while the FPD support as described is lifted, elasticity of the coiled springs (53) and the leaf spring (41) of the pulling assembly (40) pull the supporting bracket (20) and allow the supporting bracket (20) to pivot toward the panel frame (10) and to return to an original state.

Figure 8:
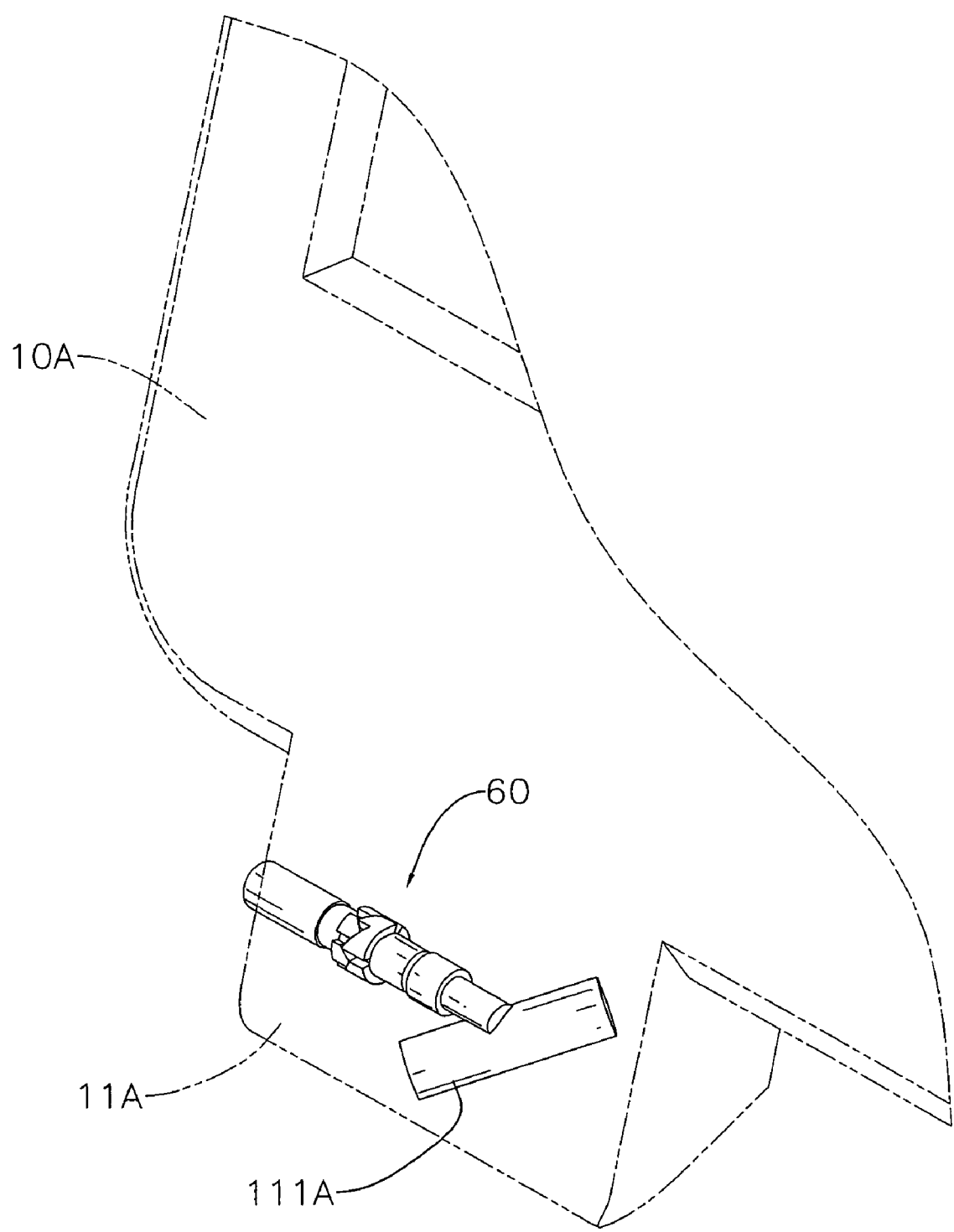
FIG. 8 is a perspective view of a locking assembly of the FPD support in FIG. 7, showing a panel frame in phantom line.

With further reference to FIG. 8, the locking assembly (60) is mounted in the mounting recess (112A) of the first foot (11A) of the panel frame (10A), selectively locks the wheel (111A) in the wheel recess (110A) of the first foot (11A) of the panel frame (10A) to position the panel frame (10A) in a specific position and has a locking rod (61), a driven rod (62), a resilient element (63), a driving rod (64) and a cap (65).

The locking rod (61) has an inner end and an outer end. The inner end of the locking rod (61) corresponds to and selectively abuts the wheel (111A) of the first foot (11A) of the panel frame (10A).

The driven rod (62) is adjacent to the outer end of the locking rod (61) and has an outer surface, an outer end, a tubular end (621), a multiple positioning protrusions (622) and multiple guiding recesses (623). The tubular end (621) is mounted around the outer end of the locking rod (61). The positioning protrusions (622) are separately formed around the outer surface of the driven rod (62). Each positioning protrusion (622) has an outer edge and two indentations (624). The indentations (624) are formed in the outer edge of the positioning protrusion (622). The guiding recesses (623) are respectively formed between the adjacent positioning protrusions (622) and respectively and correspond to and are selectively mounted around the ribs (113A) of the first foot (11A) of the panel frame (10A).

The resilient element (63) is mounted in the tubular end (621) of the driven rod (62) and has two ends. The ends of the resilient element (63) respectively abut the driven rod (62) and the locking rod (61).

The driving rod (64) is tubular, is mounted around the outer end of the driven rod (62) and has an inner end, an outer end and multiple pushing protrusions (641). The pushing protrusions (641) are separately formed around the inner end of the driving rod (64), respectively correspond to and selectively abut in the indentations (624) of the positioning protrusions (622) of the driven rod (62). Each two pushing protrusions (641) are selectively mounted between the adjacent ribs (113A) of the first foot (11A) of the panel frame (10A).

The cap (65) is mounted on the outer end of the driving rod (64) and protrudes out of the mounting recess (112A) of the first foot (11A) of the panel frame (10A).

While pushing the cap (65) and the driving rod (64) of the locking assembly (60), the driving rod (64) turns the driven rod (62).

As the ribs (113A) are respectively mounted through the guiding recesses (623) of the driven rod (62), the locking assembly (60) is unlocked and the inner end of the locking rod (61) loosens the wheel (111A) of the first foot (11A) of the panel frame (10A). Therefore, the wheel (111A) of the first foot (11A) turns with the wheel (121A) of the second foot (12A) and the visual angle of the FPD is adjusted.

As the pushing protrusions (641) of the driving rod (64) are respectively mounted in the indentations (624) of the positioning protrusions (622) of the driven rod (62), the inner end of the ribs (113A) abut the outer edge of the positioning protrusions (622) of the driven rod (62), the locking assembly (60) is locked and the inner end of the locking rod (61) abuts the wheel (111A) of the first foot (11A) of the panel frame (10A). Therefore, the wheel (111A) of the first foot (11A) does not turn and the visual angle of the FPD is not adjusted.

The FPD support as described has the following advantages. The supporting bracket (20) pivots relative to the connecting assembly (30), the panel frame (10, 10A) and the FPD in the panel frame (10, 10A). The weight of the FPD allows the FPD and the supporting bracket (20) leaning to each other to stay in a specific angle. The FPD with the FPD support is light, simple and portable and is conveniently packaged for sale or transportation and does not occupy a large area when in use.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A flat panel display (FPD) support comprising
    a supporting bracket being hollow and having
        an inner cavity;
        an upper edge;
        a through hole being formed through the upper edge of the supporting bracket and communicating with the inner cavity; and
        a rod being mounted in the inner cavity of the supporting bracket and being parallel to the upper edge of the supporting bracket;
    a connecting assembly being pivotally connected to the supporting bracket and having
        a connector having a through hole being formed through the connector and corresponding to the through hole of the supporting bracket; and
        a guiding shaft being mounted through the connector and being rotatably connected to the supporting bracket; and
    a pulling assembly being mounted between the supporting bracket and the connecting assembly, being wound around the rod of the supporting bracket, being mounted through the through holes of the supporting bracket and the connector of the connecting assembly, being mounted on the guiding shaft of the connecting assembly and having two ends being respectively attached to the rod of the supporting bracket and the connector of the connecting assembly.

2. The FPD support as claimed in claim 1, wherein the pulling assembly further has
    a leaf spring being wound around the rod of the supporting bracket; and
    a rope being mounted on the guiding shaft of the connecting assembly being mounted through the through holes of the supporting bracket and the connector of the connecting assembly and having two ends being respectively attached to the connector of the connecting assembly and the leaf spring.

3. The FPD support as claimed in claim 2, wherein
    the supporting bracket further has two leading tracks being separately mounted in the inner cavity of the supporting bracket adjacent to the through hole of the supporting bracket and being perpendicular to the upper edge of the supporting bracket;
    the rod of the supporting bracket is mounted between the leading tracks;
    the connecting assembly further has
        a guiding roller being rotatably mounted around the guiding shaft of the connecting assembly;
        a mounting shaft being mounted in the connector; and
        a mounting roller being rotatably mounted around the mounting shaft of the connecting assembly;
    the leaf spring of the pulling assembly further has two opposite edges being respectively mounted movably between the leading tracks of the supporting bracket;
    the rope of the pulling assembly is wound around the mounting roller of the connecting assembly and is mounted on the guiding roller on the guiding shaft; and
    the ends of the rope of the pulling assembly are respectively attached to the mounting roller of the connecting assembly and the leaf spring.

4. The FPD support as claimed in claim 3, wherein
    the connector of the connecting assembly further has
        a fastening bracket having
            a rear surface; and
            two limiting protrusions being separately formed on the rear surface of the fastening bracket and corresponding to each other; and
        a pivoting cover being securely mounted on the fastening bracket and having a pivoting protrusion being hollow, being mounted around the limiting protrusions of the fastening bracket and being pivotally connected to the supporting bracket;
    the through hole of the connector of the connecting assembly is formed through the pivoting protrusion of the pivoting cover;
    the guiding shaft of the connecting assembly is mounted through the limiting protrusions of the fastening bracket and the pivoting protrusion of the pivoting cover; and
    the mounting shaft, the guiding roller and the mounting roller of the connecting assembly are mounted between the limiting protrusions of the fastening bracket.

5. The FPD support as claimed in claim 4, wherein
    the supporting bracket further has
        a lower edge;
        a pivot recess being formed in the upper edge of the supporting bracket and having a bottom; and
        two feet being formed on and protruding oppositely from the lower edge of the supporting bracket;
    the through hole of the supporting bracket is formed through the bottom of the pivot recess;

the pivoting protrusion of the pivoting cover of the connector of the connecting assembly is mounted in the pivot recess of the supporting bracket; and the FPD support further has a sliding assembly is mounted between the feet of the supporting bracket and has a moving roller being rotatably mounted between the feet of the supporting bracket.

6. The FPD support as claimed in claim 5, wherein
the sliding assembly further has
   two spring seats being respectively mounted on the feet of the supporting bracket; and
   two coiled spring being respectively mounted in the spring seats, and each coiled spring being wound around the corresponding bar of the moving roller and having two ends, and one end of the coiled spring being securely attached to the corresponding spring seat; and
the moving roller of the sliding assembly further has
   two ends; and
   two bars being respectively formed on and protruding from the ends of the moving roller, being respectively and rotatably mounted through and into the spring seats and being securely attached to another ends of the coiled springs in the corresponding spring seats.

7. The FPD support as claimed in claim 1, wherein
the FPD support further has a panel frame;
the supporting bracket holds the panel frame;
the connecting assembly is attached to the panel frame; and
the fastening bracket of the connecting assembly is attached to the panel frame.

8. The FPD support as claimed in claim 2, wherein
the FPD support further has a panel frame;
the supporting bracket holds the panel frame;
the connecting assembly is attached to the panel frame; and
the fastening bracket of the connecting assembly is attached to the panel frame.

9. The FPD support as claimed in claim 3, wherein
the FPD support further has a panel frame;
the supporting bracket holds the panel frame;
the connecting assembly is attached to the panel frame; and
the fastening bracket of the connecting assembly is attached to the panel frame.

10. The FPD support as claimed in claim 7, wherein the panel frame further has
a bottom;
a first foot being separately formed on and protruding from the bottom of the panel frame; and
a second foot being separately formed on and protruding from the bottom of the panel frame and being opposite to the first foot.

11. The FPD support as claimed in claim 8, wherein the panel frame further has
a bottom;
a first foot being separately formed on and protruding from the bottom of the panel frame; and
a second foot being separately formed on and protruding from the bottom of the panel frame and being opposite to the first foot.

12. The FPD support as claimed in claim 9, wherein the panel frame further has
a bottom;
a first foot being separately formed on and protruding from the bottom of the panel frame; and
a second foot feet being separately formed on and protruding from the bottom of the panel frame and being opposite to the first foot.

13. The FPD support as claimed in claim 10, wherein
each of the first and the second feet of the panel frame further has
   a bottom surface;
   a side surface; and
   a wheel recess being formed in the bottom surface of the corresponding foot and being oblique to the side surface of the corresponding foot; and
the panel frame further has two wheels being respectively and rotatably mounted in the wheel recesses of the first and the second feet.

14. The FPD support as claimed in claim 11, wherein
each of the first and the second feet of the panel frame further has
   a bottom surface;
   a side surface; and
   a wheel recess being formed in the bottom surface of the corresponding foot and being oblique to the side surface of the corresponding foot; and
the panel frame further has two wheels being respectively and rotatably mounted in the wheel recesses of the first and the second feet.

15. The FPD support as claimed in claim 12, wherein
each of the first and the second feet of the panel frame further has
   a bottom surface;
   a side surface; and
   a wheel recess being formed in the bottom surface of the corresponding foot and being oblique to the side surface of the corresponding foot; and
the panel frame further has two wheels being respectively and rotatably mounted in the wheel recesses of the first and the second feet.

16. The FPD support as claimed in claim 13, wherein
the first foot of the panel frame further has
   a mounting recess being formed in the side surface of the first foot, communicating with the wheel recess of the first foot and having an inner surface; and
   multiple ribs being separately and axially formed on the inner surface of the mounting recess of the first foot, and each rib having an inner end;
the FPD support further comprises a locking assembly being mounted in the mounting recess of the first foot of the panel frame, selectively locking the wheel in the wheel recess of the first foot of the panel frame and having
   a locking rod having
      an inner end corresponding to and selectively abutting the wheel of the first foot of the panel frame; and
      an outer end;
   a driven rod being adjacent to the outer end of the locking rod and having
      an outer surface;
      an outer end;
      a tubular end being mounted around the outer end of the locking rod;
      a multiple positioning protrusions being separately formed around the outer surface of the driven rod, and each positioning protrusion having
         an outer edge; and
         two indentations being formed in the outer edge of the positioning protrusion; and
      multiple guiding recesses being respectively formed between the adjacent positioning protrusions and respectively and corresponding to and being selectively mounted around the ribs of the first foot of the panel frame;

a resilient element being mounted in the tubular end of
the driven rod and having two ends respectively abutting the driven rod and the locking rod;
a driving rod being tubular, being mounted around the
outer end of the driven rod and having
an inner end;
an outer end; and
multiple pushing protrusions being separately formed
around the inner end of the driving rod, respectively
corresponding to and selectively abutting the
indentations of the positioning protrusions of the
driven rod, and each two pushing protrusions being
selectively mounted between the adjacent ribs of
the first foot of the panel frame; and
a cap being mounted on the outer end of the driving rod
and protruding out of the mounting recess of the first
foot of the panel frame.

17. The FPD support as claimed in claim 14, wherein
the first foot of the panel frame further has
a mounting recess being formed in the side surface of the
first foot, communicating with the wheel recess of the
first foot and having an inner surface; and
multiple ribs being separately and axially formed on the
inner surface of the mounting recess of the first foot,
and each rib having an inner end;
the FPD support further comprises a locking assembly
being mounted in the mounting recess of the first foot of
the panel frame, selectively locking the wheel in the
wheel recess of the first foot of the panel frame and
having
a locking rod having
an inner end corresponding to and selectively abutting
the wheel of the first foot of the panel frame; and
an outer end;
a driven rod being adjacent to the outer end of the locking rod and having
an outer surface;
an outer end;
a tubular end being mounted around the outer end of
the locking rod;
a multiple positioning protrusions being separately
formed around the outer surface of the driven rod,
and each positioning protrusion having
an outer edge; and
two indentations being formed in the outer edge of
the positioning protrusion; and
multiple guiding recesses being respectively formed
between the adjacent positioning protrusions and
respectively and corresponding to and being selectively mounted around the ribs of the first foot of
the panel frame;
a resilient element being mounted in the tubular end of
the driven rod and having two ends respectively abutting the driven rod and the locking rod;
a driving rod being tubular, being mounted around the
outer end of the driven rod and having
an inner end;
an outer end; and
multiple pushing protrusions being separately formed
around the inner end of the driving rod, respectively
corresponding to and selectively abutting the
indentations of the positioning protrusions of the
driven rod, and each two pushing protrusions being
selectively mounted between the adjacent ribs of
the first foot of the panel frame; and
a cap being mounted on the outer end of the driving rod
and protruding out of the mounting recess of the first
foot of the panel frame.

18. The FPD support as claimed in claim 15, wherein
the first foot of the panel frame further has
a mounting recess being formed in the side surface of the
first foot, communicating with the wheel recess of the
first foot and having an inner surface; and
multiple ribs being separately and axially formed on the
inner surface of the mounting recess of the first foot,
and each rib having an inner end;
the FPD support further comprises a locking assembly
being mounted in the mounting recess of the first foot of
the panel frame, selectively locking the wheel in the
wheel recess of the first foot of the panel frame and
having
a locking rod having
an inner end corresponding to and selectively abutting
the wheel of the first foot of the panel frame; and
an outer end;
a driven rod being adjacent to the outer end of the locking rod and having
an outer surface;
an outer end;
a tubular end being mounted around the outer end of
the locking rod;
a multiple positioning protrusions being separately
formed around the outer surface of the driven rod,
and each positioning protrusion having
an outer edge; and
two indentations being formed in the outer edge of
the positioning protrusion; and
multiple guiding recesses being respectively formed
between the adjacent positioning protrusions and
respectively and corresponding to and being selectively mounted around the ribs of the first foot of
the panel frame;
a resilient element being mounted in the tubular end of
the driven rod and having two ends respectively abutting the driven rod and the locking rod;
a driving rod being tubular, being mounted around the
outer end of the driven rod and having
an inner end;
an outer end; and
multiple pushing protrusions being separately formed
around the inner end of the driving rod, respectively
corresponding to and selectively abutting the
indentations of the positioning protrusions of the
driven rod, and each two pushing protrusions being
selectively mounted between the adjacent ribs of
the first foot of the panel frame; and
a cap being mounted on the outer end of the driving rod
and protruding out of the mounting recess of the first
foot of the panel frame.

* * * * *